US011896028B2

(12) United States Patent
Plociak et al.

(10) Patent No.: US 11,896,028 B2
(45) Date of Patent: Feb. 13, 2024

(54) DUAL-TEXTURED CONFECTIONERY; AND METHODS OF MAKING THE SAME

(71) Applicant: INTERCONTINENTAL GREAT BRANDS LLC, East Hanover, NJ (US)

(72) Inventors: Anna Plociak, East Hanover, NJ (US); Jo Dixon, East Hanover, NJ (US); Gerald B. Cotten, East Hanover, NJ (US)

(73) Assignee: INTERCONTINENTAL GREAT BRANDS LLC, East Hanover, NJ (US)

( * ) Notice: Subject to any disclaimer, the term of this patent is extended or adjusted under 35 U.S.C. 154(b) by 443 days.

(21) Appl. No.: 16/480,332

(22) PCT Filed: Feb. 6, 2018

(86) PCT No.: PCT/US2018/017021
§ 371 (c)(1),
(2) Date: Jul. 24, 2019

(87) PCT Pub. No.: WO2018/145072
PCT Pub. Date: Aug. 9, 2018

(65) Prior Publication Data
US 2019/0373912 A1 Dec. 12, 2019

Related U.S. Application Data

(60) Provisional application No. 62/455,419, filed on Feb. 6, 2017.

(51) Int. Cl.
| | |
|---|---|
| A23G 3/54 | (2006.01) |
| A23G 3/34 | (2006.01) |
| A23G 4/20 | (2006.01) |
| A23G 3/42 | (2006.01) |
| A23G 4/02 | (2006.01) |
| A23G 4/06 | (2006.01) |
| A23G 4/10 | (2006.01) |

(52) U.S. Cl.
CPC ............ *A23G 3/54* (2013.01); *A23G 3/0085* (2013.01); *A23G 3/343* (2013.01); *A23G 3/42* (2013.01); *A23G 4/025* (2013.01); *A23G 4/062* (2013.01); *A23G 4/10* (2013.01); *A23G 4/20* (2013.01); *A23V 2002/00* (2013.01)

(58) Field of Classification Search
None
See application file for complete search history.

(56) References Cited

U.S. PATENT DOCUMENTS

| | | |
|---|---|---|
| 3,492,131 A | 1/1970 | Schlatter |
| 4,032,661 A | 6/1977 | Rowsell et al. |
| 4,136,163 A | 1/1979 | Watson et al. |
| 4,178,459 A | 12/1979 | Watson et al. |
| 4,230,688 A | 10/1980 | Rowsell et al. |
| 4,296,255 A | 10/1981 | Roswell et al. |
| 4,459,425 A | 7/1984 | Amano et al. |
| 4,619,834 A | 10/1986 | Zanno et al. |
| 5,009,893 A | 4/1991 | Cherukuri et al. |
| 5,206,042 A | 4/1993 | Dave et al. |
| 5,266,592 A | 11/1993 | Grub et al. |
| 5,407,665 A | 4/1995 | McLaughlin et al. |
| 5,545,424 A | 8/1996 | Nakatsu et al. |
| 5,679,397 A | 10/1997 | Kuroda et al. |
| 5,698,181 A | 12/1997 | Luo |
| 6,159,509 A | 12/2000 | Johnson et al. |
| 6,277,385 B1 | 8/2001 | Luke |
| 6,592,884 B2 | 7/2003 | Hofmann et al. |
| 6,627,233 B1 | 9/2003 | Wolf et al. |
| 6,780,443 B1 | 8/2004 | Nakatsu et al. |
| 7,030,273 B1 | 4/2006 | Sun |
| 7,189,760 B2 | 3/2007 | Erman et al. |
| 2005/0222256 A1 | 10/2005 | Erman et al. |
| 2005/0265930 A1 | 12/2005 | Erman et al. |
| 2007/0269577 A1 | 11/2007 | Pershad et al. |
| 2007/0275129 A1 | 11/2007 | Pershad et al. |
| 2009/0130251 A1* | 5/2009 | Perry ............... A23G 3/343 426/5 |

(Continued)

FOREIGN PATENT DOCUMENTS

| | | |
|---|---|---|
| AU | 2012202303 A1 | 5/2012 |
| JP | 11127785 A | 5/1999 |
| JP | 2015126702 A | 7/2015 |
| WO | 2006125334 A1 | 11/2006 |
| WO | 2010092480 A1 | 8/2010 |
| WO | 2011084759 A2 | 7/2011 |
| WO | 2011084760 A2 | 7/2011 |
| WO | 2014173924 A1 | 10/2014 |
| WO | 2015051056 A1 | 4/2015 |

OTHER PUBLICATIONS

International Search Report for International Application No. PCT/US2018/017021, International Filing Date Feb. 6, 2018, dated May 22, 2018, 6 pages.

(Continued)

*Primary Examiner* — Lien T Tran
(74) *Attorney, Agent, or Firm* — CANTOR COLBURN LLP

(57) ABSTRACT

Disclosed are confectionery products having a dual texture provided by a combination of sanding coating and chewy confectionery core. The confectionery product provides a crunchy texture imparted by a particulate coating and a chewy texture imparted by the confectionery core. Also disclosed are methods of preparing the dual-textured confectionery product using a particulate coating composition. Upon consumption, the confectionery product exhibits reduced adhesion to a consumer's teeth, dental braces, palatal expanders, dental retainers, and other orthodontic appliances.

27 Claims, 1 Drawing Sheet

(56) References Cited

U.S. PATENT DOCUMENTS

| | | |
|---|---|---|
| 2009/0142444 A1 | 6/2009 | Jarrard, Jr. et al. |
| 2010/0129489 A1 | 5/2010 | Ashokan et al. |
| 2012/0015071 A1 | 1/2012 | Ortega et al. |
| 2013/0052307 A1* | 2/2013 | Elejalde .................. A23P 20/12 426/93 |
| 2013/0129861 A1 | 5/2013 | Campomanes Marin et al. |
| 2013/0209605 A1 | 8/2013 | Adivi et al. |
| 2013/0224334 A1 | 8/2013 | Jarrard et al. |
| 2018/0000112 A1* | 1/2018 | Elejalde ............... A23G 3/0085 |

OTHER PUBLICATIONS

Kirk-Othmer Encyclopedia of Chem. Tech. 4th Ed. vol. 1, p. 492-494, 1991.
Written Opinion for International Application No. PCT/US2018/017021, International Filing Date Feb. 6, 2018, dated May 22, 2018, 8 pages.

\* cited by examiner

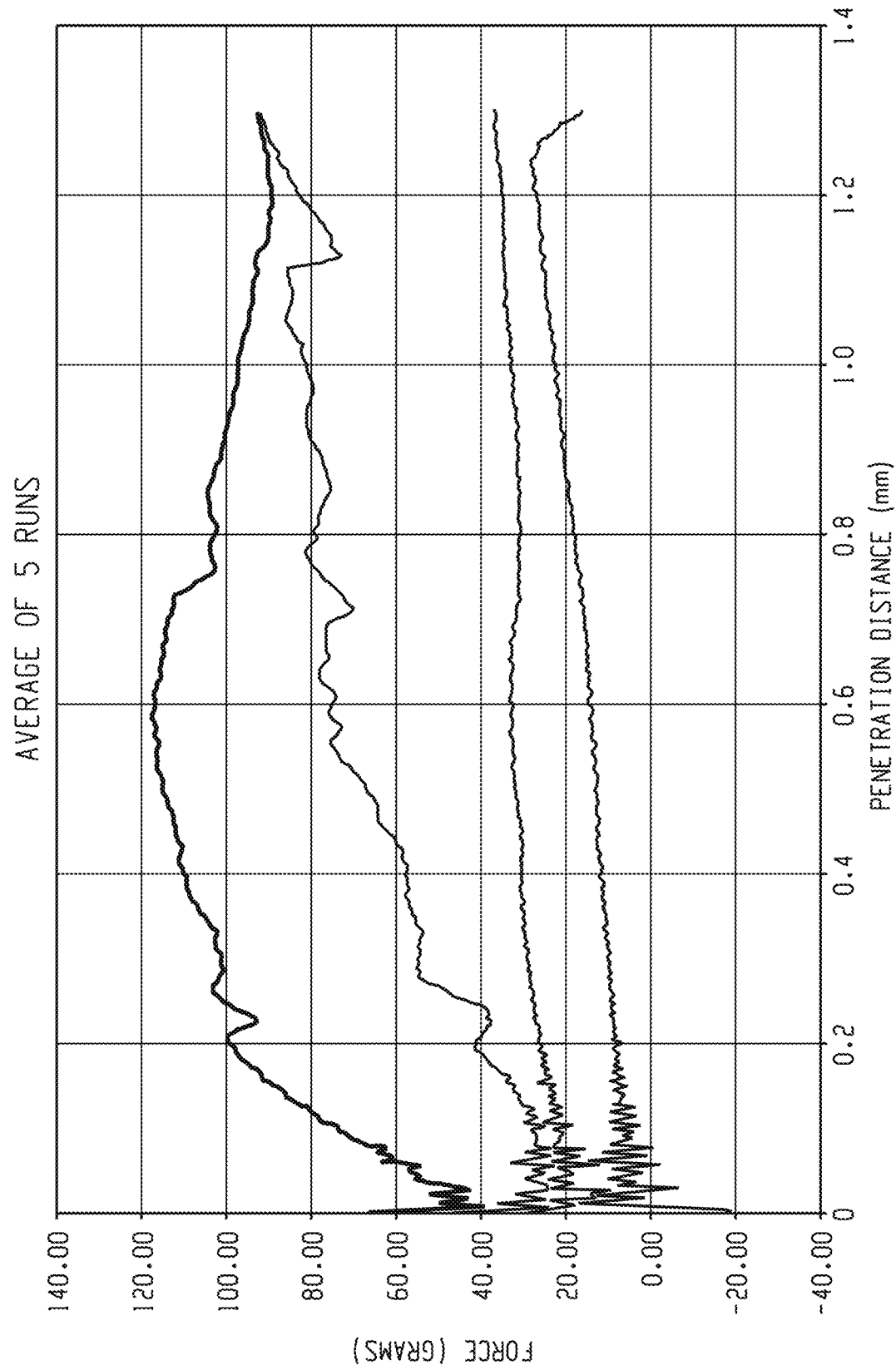

DUAL-TEXTURED CONFECTIONERY; AND METHODS OF MAKING THE SAME

CROSS-REFERENCE TO RELATED APPLICATIONS

This Application is a U.S. National Stage Application of International Application No. PCT/US2018/017021, filed Feb. 6, 2018, which claims the benefit of U.S. Provisional Patent Application No. 62/455,419 filed Feb. 6, 2017, each of which is incorporated by reference in its entirety.

FIELD

This disclosure generally relates to coated confectionery products having at least two textures when chewed, and methods of preparing the same.

BACKGROUND

Coatings are included on confectionery and chewing gum compositions for a variety of purposes including providing a color or texture, for providing a flavor, for protection of the core, and the like.

Coatings can be prepared as smooth, uniform layers such as hard panned coatings or soft coatings. Other known coatings include particulate coatings such as the coatings on so-called "sanded" products, for example the particulate sugar coating on traditional gum drops.

Sanded products, although providing some crunchy texture at the initial stages of the chew process, quickly lose the texture imparted by the sanded coating after the consumer starts to chew the product. There remains a need in the art for the preparation of confectionery products having more than one texture that lasts for a substantial part of the chew process so that the consumer experiences multiple textures for much of the chew duration.

Gummi and jelly confectionery are popular with consumers for their soft, chewy texture, ability to deliver intense flavors of fruit, sour, etc. A drawback of the gummi and jelly candies is that they adhere to teeth, dental braces, palatal expanders, dental retainers, and other orthodontic appliances when chewed. There remains a need in the art for a gummi and jelly confectionery that, when chewed, adheres less to the teeth and orthodontic appliances of a consumer compared to traditional gummi and jelly confectionery products.

SUMMARY

In one embodiment, a dual-textured confectionery product, comprises a chewy confectionery substrate comprising a surface, and a particulate coating at least partially coating the surface of the confectionery substrate; wherein the particulate coating has a multimodal particle size distribution and comprises a first particulate coating composition and a second particulate coating composition; wherein the first particulate coating composition comprises a saccharide particulate, a sugar alcohol particulate, or a combination thereof having a particle size distribution wherein at least 50% by weight of the particulates are larger than 500 micrometers and smaller than 3350 micrometers; and the second particulate coating composition comprises a saccharide particulate, a sugar alcohol particulate, or a combination thereof having a particle size distribution wherein at least 50% by weight of the particulates are larger than 20 micrometers and smaller than 1000 micrometers.

In another embodiment, a dual-textured confectionery product, comprises a gummi or jelly confectionery substrate comprising a surface, and a particulate coating at least partially coating the surface of the confectionery substrate; wherein the particulate coating has a multimodal particle size distribution and comprises a first particulate coating composition and a second particulate coating composition; wherein the first particulate coating composition comprises a saccharide particulate, a sugar alcohol particulate, or a combination thereof having a particle size distribution wherein at least 50% by weight of the particulates are larger than 500 micrometers and smaller than 3350 micrometers; and the second particulate coating composition comprises a saccharide particulate, a sugar alcohol particulate, or a combination thereof having a particle size distribution wherein at least 50% by weight of the particulates are larger than 20 micrometers and smaller than 1000 micrometers.

In one embodiment, a method of making dual-textured confectionery product comprises forming a tacky surface on at least a portion of a surface of a chewy confectionery composition substrate; applying a first particulate coating composition to at least a portion of the tacky surface to form an intermediate product comprising a surface; forming a tacky surface on at least a portion of a surface of the intermediate product; applying a second particulate coating composition to at least a portion of the tacky surface to form the dual-textured confectionery product; and optionally further packaging the product, wherein the dual-textured confectionery product has a particulate coating having a multimodal particle size distribution, wherein the particulate coating is comprised of the first particulate coating composition and the second particulate coating composition, wherein the first particulate coating composition comprises a saccharide particulate, a sugar alcohol particulate, or a combination thereof having a particle size distribution wherein at least 50% by weight of the particulates are larger than 500 micrometers and smaller than 3350 micrometers; and the second particulate coating composition comprises a saccharide particulate, a sugar alcohol particulate, or a combination thereof having a particle size distribution wherein at least 50% by weight of the particulates are larger than 20 micrometers and smaller than 1000 micrometers.

In another embodiment, a method of reducing the stickiness of a chewy confectionery product, or reducing the adhesion of the chewy confectionery to a consumer's teeth, dental braces, palatal expanders, dental retainers, and other orthodontic appliances when consumed, comprises coating the surface of a chewy confectionery substrate with a particulate coating comprising a first particulate coating composition comprising a saccharide particulate, a sugar alcohol particulate, or a combination thereof having a particle size distribution wherein at least 50% by weight of the particulates are larger than 500 micrometers and smaller than 3350 micrometers; optionally the particulate coating further comprises a second particulate coating composition comprising a saccharide particulate, a sugar alcohol particulate, or a combination thereof having a particle size distribution wherein at least 50% by weight of the particulates are larger than 20 micrometers and smaller than 1000 micrometers, wherein when the second particulate coating composition is used, the particulate coating has a multimodal particle size distribution.

The above described and other features are exemplified by the following detailed description.

BRIEF DESCRIPTION OF THE DRAWINGS

The accompanying drawings incorporated in and forming a part of the specification:

FIG. 1. Texture analyzer curves for an uncoated jelly candy core (Control, uncoated; bottom trace); a jelly candy core sanded with standard size particulate sugar and a food acid mixture (Control, coated; second to bottom trace); jelly candy core sanded with two particulate coating compositions, the first coating composition having a large sugar particle size than the second coating composition (Sample 3; top trace); and a jelly core sanded with two particulate coating compositions, the first coating composition having a large sugar particle size than the second coating composition (Sample 4; second trace from top).

DETAILED DESCRIPTION

Disclosed herein is a dual-textured confectionery product comprising a chewy confectionery substrate comprising a surface, and a particulate coating at least partially coating the surface of the confectionery substrate, where the chewy confectionery substrate provides a chewy texture when the product is chewed and the particulate coating imparts a crunchy texture when the product is chewed, where the particulate coating contains particulates having a large enough particle size that the crunchy texture (sensory attribute) lasts for at least 50% of the time of the chew duration, specifically greater than 60%, more specifically greater than 75% or more of the chew duration, up to the total time (100%) of the time of the chew duration at which point the product has been consumed.

The particulate coating can have a particle size distribution that is multimodal. That is, the particle size distribution has more than one mode, e.g. at least two modes or two or more modes. The particulate coating can be made from a first particulate coating composition and a second particulate coating composition, where the particle size of the first particulate coating composition is larger than the particle size of the second particulate coating composition. It further has been surprisingly found that the dual-textured confectionery product has the advantage of being less sticky (i.e., reduced adhesion) to teeth and orthodontic appliances when chewed by the consumer compared to a corresponding product free of the first particulate coating composition (i.e., the larger size particulates) or free of a particulate coating altogether. The "corresponding product free of the first particulate coating composition" means the product is made from the same substrate material as the dual-textured confectionery product, but does not contain a particulate coating made from the first particulate coating composition (i.e., the larger size particulates), although it may contain a particulate coating of the second particulate coating composition (i.e., the smaller size particulates) as described herein.

Not wishing to be bound by theory, but it is theorized that the larger sized particulates prevent the chewy confectionery from adhering to the surface of a consumer's teeth and prevents the chewy confectionery from getting stuck in the gaps between the teeth. Since the amount of chewy confectionery that gets stuck in the gaps between the teeth is reduced, the dual-textured confectionery product is easier to chew. That is, once a consumer bites down on the product, it is easier to pull the jaws apart because the chewy confectionery is not impacted in and around the teeth as much as a corresponding product free of the first particulate coating.

Particulate Coating Composition

In general, the particulate coating composition comprises a plurality of particulates of crystalline saccharide, an amorphous saccharide, a crystalline sugar alcohol, an amorphous sugar alcohol, nonpareils, or a combination thereof. In an embodiment, the particulates are of crystalline material.

Additional components that can be present in the particulate coating composition include a particulate food acid or a salt thereof, a colorant powder, a colorant flake including glitter, a flavorant, a flavor modulator or potentiator, a sensate, a functional ingredient, a high-intensity sweetener, or a combination thereof, as is further described herein. In some embodiments, each individual or combination of additional components is encapsulated or unencapsulated (or "free"). If more than one ingredient is used, the particulate coating composition may contain any combination of encapsulated or unencapsulated ingredients.

The saccharide particulates can include mono-saccharides, di-saccharides and poly-saccharides such, as but not limited to, sucrose (sugar), dextrose/glucose, maltose, dextrin, xylose, ribose, mannose, galactose, fructose (levulose), lactose, or a combination thereof. Within this embodiment, the saccharide particulates can be crystalline, including crystalline sucrose (sugar).

As used herein, the term "sugar alcohol" is interchangeable with "sugar polyol". The sugar alcohol particulates can be erythritol, galactitol, isomalt (hydrogenated isomaltulose), lactitol, maltitol, mannitol, sorbitol, xylitol, and the like, or a combination thereof. Within this embodiment, the sugar alcohol particulates can be crystalline.

When crystalline saccharide or crystalline sugar alcohol particulates are used in the coating, the coating is translucent, allowing the underlying color of the substrate to be visible through the coating.

The food acid or salt thereof that can be used in the particulate coating compositions include acetic acid, adipic acid, ascorbic acid, butyric acid, citric acid, formic acid, fumaric acid, glyconic acid, lactic acid, phosphoric acid, malic acid, oxalic acid, succinic acid, tartaric acid, or a combination thereof, and alkali metal salts thereof (e.g., sodium citrate dihydrate). In an embodiment, the particulate coating composition can include an acid blend including two or more acids such as an acid blend of citric acid, lactic acid, tartaric acid, or fumaric acid. In an embodiment, the particulate coating composition comprises citric acid, lactic acid, and tartaric acid. In another embodiment, the particulate coating composition comprises citric acid and tartaric acid. In yet another embodiment, the particulate coating composition comprises tartaric acid.

The particle size of the particulates in the particulate coating composition can be selected such that it provides the product with a crunchy texture when chewed. Exemplary particle sizes are larger than the particle size of standard sized crystalline sucrose. Suitably large particle sizes include, for example, particles having a particle size distribution wherein at least 50% by weight of the particulates are larger than 500 micrometers and smaller than 3350 micrometers, specifically wherein at least 50% by weight of the particulates are larger than 600 micrometers and smaller than 2360 micrometers, more specifically wherein at least 50% by weight of the particulates are larger than 710 micrometers and smaller than 2000 micrometers, yet more specifically wherein at least 50% by weight of the particulates are larger than 850 micrometers and smaller than 1700 micrometers, and still yet more specifically wherein at least 50% by weight of the particulates are larger than 1000 micrometers and smaller than 1400 micrometers.

In one embodiment, the large particle size material has a particle size distribution where 30-80% by weight of the material has a particle size that is greater than 1180 micrometers, optionally further wherein 0-15% by weight has a particle size that is greater than 1700 micrometers. In another embodiment, the large particle size material has a particle size distribution where 30-65% by weight of the material has a particle size that is greater than 1180 micrometers and smaller than 1700 micrometers, optionally further wherein 0-15% by weight has a particle size that is greater than 1700 micrometers. Within these embodiments, the particle size can be determined by sieve analysis.

In another embodiment, the large particle size material has a particle size distribution where 35-85% by weight of the material has a particle size that is greater than 1700 micrometers, optionally further wherein 0-30% by weight has a particle size that is greater than 850 micrometers and smaller than 1180 micrometers, and 15% or more by weight has a particle size that is greater than 1180 micrometers and smaller than 1700 micrometers. Within this embodiment, the particle size can be determined by sieve analysis.

In an embodiment, a first particulate coating composition comprises sugar alcohol or saccharide particulates having the large particle size described herein, which may be measured by any suitable technique in the art, such as sieve analysis, laser diffraction, etc.

A second particulate coating composition having a smaller particle size than the first particulate coating composition can be used, which may be measured by any suitable technique in the art, such as sieve analysis, laser diffraction, etc. In an embodiment, the particle size of the sugar alcohol or saccharide particulate in first particulate coating composition is at least one and a half times, or about two times, or about three times, or about three and a half times, or about four times the particle size of the sugar alcohol or saccharide particulate of the second particulate coating composition to result in a product having a particulate coating having a bimodal particle size distribution.

The second particulate coating composition can comprise sugar alcohol or saccharide particulates having the smaller particle size. Other ingredients that may be included in the second particulate coating composition as described herein (e.g. food acid) can also meet the smaller particle size requirements. Exemplary particle sizes are smaller than the large particle sizes described above. Suitable smaller particle sizes for the second particulate coating composition include, for example, particles having a particle size distribution wherein at least 50% by weight of the particulates are larger than 20 micrometers and smaller than 1000 micrometers, specifically wherein at least 50% by weight of the particulates are larger than 100 micrometers and smaller than 900 micrometers, more specifically wherein at least 50% by weight of the particulates are larger than 200 micrometers and smaller than 800 micrometers, yet more specifically wherein at least 50% by weight of the particulates are larger than 300 micrometers and smaller than 700 micrometers, and still yet more specifically wherein at least 50% by weight of the particulates are larger than 400 micrometers and smaller than 600 micrometers.

In one embodiment, the smaller particle size material has a particle size distribution where 30-75% by weight of the material has a particle size that is greater than 425 micrometers, optionally further wherein 0-5% by weight has a particle size that is greater than 850 micrometers. Within this embodiment, the particle size can be determined by sieve analysis.

In an embodiment, the first particulate coating composition and second particulate coating composition comprise sugar alcohol or saccharide particulates having a particle size as determined by sieve analysis using seven sieves constructed from woven-wire mesh stacked one on top of another in ascending degrees of coarseness with a collection pan at the bottom. The sieve stack contains U.S. Standard sieves: #12 (1700 micrometers), #16 (1180 micrometers), #20 (850 micrometers), #30 (600 micrometers), #40 (425 micrometers), #50 (300 micrometers), and #80 (180 micrometers). The test material is weighed and placed in the top sieve. The amount of test material is about 50 to about 51 grams. The agitation method and agitation parameters used W.S. Tyler Ro-Tap® Model RX-29 having a horizontal, circular motion and a vertical, tapping motion; 8" diameter test sieves; 278±10 oscillations per minute; 1⅛"×⁷⁄₁₆" oscillations displacement; 150±10 taps per minute; Fine material setting; testing time of 10 minutes; and ambient temperature. After the nested stack is agitated, the remaining material retained on each sieve is weighed. The results are reported as the weight percentage of material in each sieve size range. The method of this embodiment is referred to as the "Seven Sieve Method".

In an embodiment, the large particle size material of the first particulate coating composition has a particle size distribution where 7-25%, specifically 10-20% by weight of the material has a particle size that is greater than 1700 micrometers; 50-90%, specifically 60-80% by weight has a particle size that is greater than 1180 micrometers and smaller than 1700 micrometers; and 5-20%, specifically 8-18% by weight has a particle size that is greater than 850 micrometers and smaller than 1180 micrometers as measured by the Seven Sieve Method.

In an embodiment, the large particle size material of the first particulate coating composition has a particle size distribution where 25-55%, specifically 30-50% by weight of the material has a particle size that is greater than 1700 micrometers; 35-75%, specifically 45-65% by weight has a particle size that is greater than 1180 micrometers and smaller than 1700 micrometers; and 0-5%, specifically 1-3% by weight has a particle size that is greater than 850 micrometers and smaller than 1180 micrometers as measured by the Seven Sieve Method.

In an embodiment, the smaller particle size material of the second particulate coating composition has a particle size distribution where 3-15%, specifically 5-10% by weight has a particle size that is greater than 600 micrometers and smaller than 850 micrometers; 40-80%, specifically 50-70% by weight has a particle size that is greater than 425 micrometers and smaller than 600 micrometers; 15-35%, specifically 20-30% by weight has a particle size that is greater than 300 micrometers and smaller than 425 micrometers; and 0-5% by weight has a particle size that is greater than 180 micrometers and smaller than 300 micrometers as measured by the Seven Sieve Method.

In an embodiment, the smaller particle size material of the second particulate coating composition has a particle size distribution where 10-30%, specifically 15-25% by weight has a particle size that is greater than 600 micrometers and smaller than 850 micrometers; 30-70%, specifically 40-60% by weight has a particle size that is greater than 425 micrometers and smaller than 600 micrometers; 10-30% specifically 15-25% by weight has a particle size that is greater than 300 micrometers and smaller than 425 micrometers; and 0-7%, specifically 2-6% by weight has a particle size that is greater than 180 micrometers and smaller than 300 micrometers as measured by the Seven Sieve Method.

The particulate coating on the substrate may be continuous or discontinuous. The particulate coating may completely surround, coat, cover, or enclose a substrate. Alternatively, the particulate coating can partially surround, coat, or cover the substrate. For example, a single surface of the substrate may be coated, such as a top surface or both a top and bottom surface. Still further, a surface may not be completely coated, but only partially coated. In one embodiment, the substrate is completely coated with the particulate coating. In another embodiment, less than 95% of the surface area of the substrate is coated with the particulate coating such that the substrate is clearly visible, more specifically, less than 90% of the surface area of the substrate is coated with the particulate coating. Within this embodiment, at least 80%, specifically at least 85% of the surface area of the substrate is coated with the particulate coating. The color of the substrate and the particulate coating can be different or the same, specifically they are different.

The dual-textured confectionery product can comprise a total amount of a particulate coating composition of about 7 to about 50 wt %, about 10 to about 40 wt %, specifically about 15 to about 35 wt %, more specifically about 20 to about 30 wt %, and yet more specifically about 25 to about 30 wt % based on the total weight of the dual-textured confectionery product.

When a first and a second particulate coating composition are used, the dual-textured confectionery product can comprise an amount of the first particulate coating composition of about 8 to about 30 wt %, specifically about 10 to about 28 wt %, more specifically about 12 to about 26 wt %, and yet more specifically about 15 to about 25 wt % based on the total weight of the dual-textured confectionery product.

When a first and a second particulate coating composition are used, the dual-textured confectionery product can comprise an amount of the second particulate coating composition of about 2 to about 25 wt %, specifically about 3 to about 20 wt %, more specifically about 5 to about 15 wt %, and yet more specifically about 7 to about 12 wt % based on the total weight of the dual-textured confectionery product.

In an embodiment, the particulate coating composition comprises food acid or a salt thereof in an amount of about 1 to about 15 wt % based on the total weight of the particulate coating composition, specifically about 2 to about 10 wt %, and more specifically about 3 to about 9 wt %. In an embodiment, the second particulate coating composition comprises a food acid in an amount of about 5 to about 35 wt % based on the total weight of the second particulate coating composition, specifically about 10 to about 30 wt %, and more specifically about 15 to about 25 wt %.

In an embodiment, the particulate coating composition comprises crystalline saccharide particulates and a food acid or salt thereof.

In an embodiment, the particulate coating composition comprises crystalline sugar alcohol particulates and a food acid or salt thereof.

Method of Coating

A method of making a dual-textured confectionery product comprises applying a particulate coating composition to a tackified surface of a chewy confectionery composition substrate. The surface can be tackified using steam, heat, application of water, application of a binder solution, or a combination thereof. In one embodiment, the surface of the chewy confectionery composition substrate is tackified using steam. In a specific embodiment, the dual-textured confectionery product is prepared using only the application of steam or water, and specifically does not use a binder solution, an edible glue, or other material to adhere the particulate coating composition to the substrate such that the resulting dual-textured confectionery product is free of a binding solution, edible glue, etc.

The coating process can involve a single application of a particulate coating composition, or two or more applications of the same or different particulate coating compositions, optionally with one or more tackifying steps as previously discussed.

In one embodiment, a method of making a dual-textured confectionery product comprises forming a tacky surface on at least a portion of a surface of a chewy confectionery composition substrate, applying a first particulate coating composition to at least a portion of the tacky surface to form an intermediate product comprising a surface, forming a tacky surface on at least a portion of a surface of the intermediate product, applying a second particulate coating composition to at least a portion of the tacky surface to form the dual-textured confectionery product. Within this embodiment, the first particulate coating composition can comprise a saccharide particulate, a sugar alcohol particulate, or a combination thereof having a particle size as described herein. Further within this embodiment, the second particulate coating composition can comprise a saccharide particulate, a sugar alcohol particulate, or a combination thereof having a particle size as described herein. In a specific embodiment, the forming a tacky surface is achieved using steam to render the chewy confectionery composition substrate surface tacky.

In another embodiment, a method of making a dual-textured confectionery product comprises forming a tacky surface on at least a portion of a surface of a chewy confectionery composition substrate, applying a first particulate coating composition to at least a portion of the tacky surface to form an intermediate product comprising a surface, forming a tacky surface on at least a portion of a surface of the intermediate product, applying a second particulate coating composition to at least a portion of the tacky surface to form the dual-textured confectionery product, wherein the dual-textured confectionery product has a particulate coating having a multimodal particle size distribution, wherein the particulate coating is comprised of the first particulate coating composition and the second particulate coating composition. Within this embodiment, the first particulate coating composition can comprise a saccharide particulate, a sugar alcohol particulate, or a combination thereof having a particle size distribution wherein at least 50% by weight of the particulates are larger than 500 micrometers and smaller than 3350 micrometers; and the second particulate coating composition can comprise a saccharide particulate, a sugar alcohol particulate, or a combination thereof having a particle size distribution wherein at least 50% by weight of the particulates are larger than 20 micrometers and smaller than 1000 micrometers.

In an embodiment, preparation of a dual-textured confectionery product includes the step of forming a confectionery composition substrate comprising a surface; exposing at least a portion of the confectionery composition substrate surface to steam treatment to render the surface tacky; applying a particulate coating composition to at least a portion of the tacky surface to form the dual-textured confectionery product; and optionally further packaging the product. The applying and coating steps can be performed on individual confectionery pieces or on a confectionery sheet that can later be processed into individual confectionery pieces.

In an another embodiment, the preparation of a dual-textured confectionery product includes the step of forming a confectionery composition substrate comprising a surface; exposing at least a portion of the confectionery composition substrate surface to a first steam treatment to render the surface tacky; applying a first particulate coating composition to at least a portion of the tacky surface to form an intermediate product comprising a surface; exposing at least a portion of the intermediate product surface to a second steam treatment to render the surface tacky; and applying a second particulate coating composition to at least a portion of the tacky surface to form the dual-textured confectionery product; and optionally further packaging the product.

In an alternate embodiment, instead of using steam to form a tacky surface, a binder solution is used. The binder solution can include a saccharide syrup, a sugar alcohol syrup, or a hydrocolloid solution (e.g. a gum arabic solution), which is applied to the surface of the chewy confectionery composition substrate to render it tacky. The binder solution can be applied to the surface using a process such as spraying, dipping, painting, rolling, extruding, panning, or other similar means.

An alternate approach is to heat the surface of the chewy confectionery composition substrates to soften and render tacky the surface prior to applying the particulate coating composition.

Once the dual-textured confectionery product has been formed, it can optionally be conditioned and optionally further packaged using processes and packaging known in the art.

Chewy Confectionery Substrate

The chewy confectionery substrate can be prepared from any confectionery composition, specifically confectionery compositions that provide a texture that is other than a crunchy texture, specifically one that provides a chewy texture. Suitable chewy confectionery include, for example, a gummy candy or "gummi", a jelly confectionery such as a starch based jelly, a pectin based jelly, a carrageenan based jelly, a konjac based jelly, a tapioca based jelly, a gum Arabic based jelly, a gum tragacanth based jelly, an agar-agar based jelly, a gellan based jelly, a wine gum confectionery, gum drops, licorice, chewy confectionery, a low boiled confectionery, a caramel, a nougat, a fudge, a toffee, a taffy, a chewing gum, a bubble gum, and the like.

As used herein, "gummi" candy or "gummis" are chewy candy prepared from gelatin as the sole texturizing agent or a combination of gelatin and an additional texturizing agent. As used herein "jelly" candy or "jellies" are chewy candy prepared from a texturizing agent other than gelatin.

A specific chewy confectionery substrate material is a gummi or jelly confectionery.

The basis of gummi and jelly confectionery is generally a combination of a bulk sweetener and a bulk sweetener syrup, and further a texturizing agent. Examples of bulk sweetener/bulk sweetener syrup combinations include saccharide/saccharide syrup (e.g. sugar/glucose syrup) combination, a sugar alcohol/sugar alcohol syrup combination, or a saccharide/sugar alcohol combination.

Exemplary bulk sweetener for use in the chewy confectionery can include saccharides such as mono-saccharides, di-saccharides and poly-saccharides, for example, sucrose (sugar), dextrose/glucose, maltose, dextrin, xylose, ribose, mannose, galactose, fructose (levulose), lactose, invert sugar, fructo oligo saccharide syrups, partially hydrolyzed starch, corn syrup solids, such as high fructose corn syrup, glucose syrup, or a combination thereof. Further exemplary sugarless bulk sweetener can be a sugar alcohol or sugar alcohol syrups such as erythritol, galactitol, hydrogenated isomaltulose (isomalt), a hydrogenated starch hydrolysate, lactitol, maltitol, maltitol syrup, mannitol, polyglycitol, sorbitol, sorbitol syrups, xylitol, or a combination thereof.

The texturizing agent can be a hydrocolloid including naturally occurring materials such as plant exudates, seed gums, and seaweed extracts or they may be chemically modified materials such as cellulose, starch, or natural gum derivatives. The texturizing agent may be acacia gum/gum arabic, agar agar, an alginate, bacterial gums (e.g. gellan gum), beta glucan, a carageenan, chitosan, curdlan, furcellaran, a galactomannan, gelatin, gellan gum, guar gum, gum ghatti, karaya gum, konjacxyloglucan, locust bean gum, a modified cellulose, a modified natural gum, a modified starch, pectin, a starch, tamarin, tragacanth gum, xanthan gum, or a combination thereof. Additionally, in some embodiments, the modified natural gum can be a propylene glycol alginate, carboxymethyl locust bean gum, low methoxyl pectin, or a combination thereof. In some embodiments, the modified cellulose can be carboxymethlcellulose (CMC), ethylcellulose (MC), hydroxypropylcellulose (HPC), hydroxypropyl methylcellulose (HPMC), microcrystalline cellulose, or a combination thereof.

The texturizing material may be desirably dissolved in water or otherwise hydrated prior to mixing with the bulk sweetener combination. If a hydrocolloid such as pectin is used as the gelatinizing agent, then the pectin is desirably dry mixed with a portion of the bulk sweetener prior to addition of the dry mixture to water.

In an embodiment, the gummi and jelly confectionery compositions can contain a combination of bulk sweetener and bulk sweetener syrup in an amount of about 35 to about 75 wt % based on the total weight of the confectionery composition (excluding any coating), specifically about 40 to about 70 wt %, and yet more specifically about 45 to about 65 wt % combined bulk sweetener and bulk sweetener syrup based on the total weight of the confectionery composition (excluding any coating).

In an embodiment, the gummi and jelly confectionery compositions can contain the texturizing agent in an amount of about 0.01 to about 25 wt % based on the total weight of the confectionery composition (excluding any coating), specifically about 1 to about 15 wt %, and yet more specifically about 2 to about 10 wt % texturizing agent based on the total weight of the confectionery composition (excluding any coating).

The chewy confectionery substrate may contain one or more additional components including a food acid or a salt thereof, a colorant powder, a colorant flake including glitter, a flavorant, a flavor modulator or potentiator, a sensate, a functional ingredient, a high-intensity sweetener, a fruit juice ingredient, or a combination thereof. In some embodiments, the ingredient is encapsulated or unencapsulated (or "free"). If more than one ingredient is used, the chewy confectionery substrate may contain any combination of encapsulated or unencapsulated ingredients.

The food acid suitable for use in the chewy confectionery composition can include acetic acid, adipic acid, ascorbic acid, butyric acid, citric acid, formic acid, fumaric acid, glyconic acid, lactic acid, phosphoric acid, malic acid, oxalic acid, succinic acid, tartaric acid, or a combination thereof, and alkali metal salts thereof (e.g., sodium citrate dihydrate).

The food acid or salt thereof can be present in the confectionery composition in an amount of about 0.01 to about 2.0 wt % based on the total weight of the confectionery composition, specifically about 0.1 to about 1.5 wt %, and more specifically about 0.3 to about 1.0 wt %.

Flavorants (flavor, flavoring agent) that can be used include those artificial or natural flavors known in the art, for example synthetic flavor oils, natural flavoring aromatics and/or oils, oleoresins, extracts derived from plants, leaves, flowers, fruits, and the like, or a combination thereof. Nonlimiting representative flavors include oils such as spearmint oil, cinnamon oil, oil of wintergreen (methyl salicylate), peppermint oil, clove oil, bay oil, anise oil, eucalyptus oil, thyme oil, cedar leaf oil, oil of nutmeg, allspice, oil of sage, mace, oil of bitter almonds, cassia oil, and citrus oils including lemon, orange, lime, grapefruit, vanilla, fruit essences, including apple, pear, peach, grape, strawberry, raspberry, blackberry, cherry, plum, pineapple, apricot, banana, melon, tropical fruit, mango, mangosteen, pomegranate, papaya, honey lemon, and the like, or a combination thereof. Specific flavorants are mints such as peppermint, spearmint, artificial vanilla, cinnamon derivatives, and various fruit flavors.

Other types of flavorants include various aldehydes and esters such as cinnamyl acetate, cinnamaldehyde, citral diethylacetal, dihydrocarvyl acetate, eugenyl formate, p-methylamisol, acetaldehyde (apple), benzaldehyde (cherry, almond), anisic aldehyde (licorice, anise), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), vanillin (vanilla, cream), alpha-amyl cinnamaldehyde (spicy fruity flavors), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethyl butyraldehyde (berry fruits), hexenal, i.e., trans-2 (berry fruits), tolyl aldehyde (cherry, almond), veratraldehyde (vanilla), 2,6-dimethyl-5-heptenal, i.e., melonal (melon), 2,6-dimethyloctanal (green fruit), and 2-dodecenal (citrus, mandarin).

The flavorant can be used in liquid or solid form. When used in solid (dry) form, suitable drying means such as spray drying the oil can be used. Alternatively, the flavorant can be encapsulated, absorbed onto water soluble materials by means known in the art, for example onto cellulose, starch, sugar, maltodextrin, gum arabic, and the like.

A sweet taste can be imparted by flavor modulators or potentiators and/or from flavorants as well as from sweeteners. Flavor potentiators can consist of materials that intensify, supplement, modify or enhance the taste or aroma perception of an original material without introducing a characteristic taste or aroma perception of their own. Flavor modulators can impart a characteristic of their own that complements or negates a characteristic of another component. In some embodiments, flavor modulators or potentiators are designed to intensify, supplement, modify, or enhance the perception of flavor, sweetness, tartness, umami, kokumi, saltiness or a combination thereof can be included. Thus, the addition of flavor modulators or potentiators can impact the overall taste of the product. For example, flavors can be compounded to have additional sweet notes by the inclusion of flavor modulators or potentiators, such as vanilla, vanillin, ethyl maltol, furfual, ethyl propionate, lactones, or a combination thereof.

Exemplary flavor modulators or potentiators include monoammonium glycyrrhizinate, licorice glycyrrhizinates, citrus aurantium, alapyridaine, alapyridaine (N-(1-carboxyethyl)-6-(hydroxymethyl)pyridinium-3-ol) inner salt, miraculin, curculin, strogin, mabinlin, gymnemic acid, cynarin, glupyridaine, pyridinium-betain compounds, neotame, thaumatin, neohesperidin dihydrochalcone, tagatose, trehalose, maltol, ethyl maltol, vanilla extract, vanilla oleoresin, vanillin, sugar beet extract (alcoholic extract), sugarcane leaf essence (alcoholic extract), compounds that respond to G-protein coupled receptors (T2Rs and T1Rs), or a combination thereof. In some embodiments, sugar acids, sodium chloride, potassium chloride, sodium acid sulfate, or a combination thereof are used. In other embodiments, glutamates such as monosodium glutamate, monopotassium glutamate, hydrolyzed vegetable protein, hydrolyzed animal protein, yeast extract, or a combination thereof are included. Further examples include adenosine monophosphate (AMP), glutathione, and nucleotides such as inosine monophosphate, disodium inosinate, xanthosine monophosphate, guanylate monophosphate, or a combination thereof. Further examples of flavor potentiator compositions that impart kokumi are also included in U.S. Pat. No. 5,679,397 to Kuroda et al.

The amount of flavor modulators, flavor potentiators, and flavorants used herein can be a matter of preference subject to such factors as the type of final product composition, the individual flavor, the confectionery composition employed, the strength of flavor desired, and the location of the ingredient (coating, core, or both). Thus, the amount of flavoring can be varied in order to obtain the result desired in the final product and such variations are within the capabilities of those skilled in the art without the need for undue experimentation.

The confectionery composition may further include a high intensity sweetener. A "high intensity sweetener" as used herein means agents having a sweetness greater than the sweetness of sucrose. In some embodiments, a high intensity sweetener has a sweetness that is at least 100 times that of sugar (sucrose) on a per weight basis, specifically at least 500 times that of sugar on a per weight basis. In one embodiment the high intensity sweetener is at least 1,000 times that of sugar on a per weight basis, more specifically at least 5,000 times that of sugar on a per weight basis. The high intensity sweetener can be selected from a wide range of materials, including water-soluble sweeteners, water-soluble artificial sweeteners, water-soluble sweeteners derived from naturally occurring water-soluble sweeteners, dipeptide based sweeteners, protein based sweeteners, or a combination thereof. Without being limited to particular sweeteners, representative categories and examples include:

water-soluble sweetening agents such as dihydrochalcones, monellin, steviosides, rebaudiosides, glycyrrhizin, dihydroflavenol, monatin, and L-aminodicarboxylic acid aminoalkenoic acid ester amides, such as those disclosed in U.S. Pat. No. 4,619,834, or a combination thereof;

water-soluble artificial sweeteners such as soluble saccharin salts, i.e., sodium or calcium saccharin salts, cyclamate salts, acesulfame salts, such as the sodium, ammonium or calcium salt of 3,4-dihydro-6-methyl-1,2,3-oxathiazine-4-one-2,2-dioxide, the potassium salt of 3,4-dihydro-6-methyl-1,2,3-oxathiazine-4-one-2,2-dioxide (Acesulfame-K), the free acid form of saccharin, or a combination thereof;

dipeptide based sweeteners, for example the L-aspartic acid derived sweeteners such as L-aspartyl-L-phenylalanine methyl ester (Aspartame) and materials described in U.S. Pat. No. 3,492,131, L-alpha-aspartyl-N-(2,2,4,4-tetramethyl-3-thietanyl)-D-alaninamide hydrate (Alitame), methyl esters of L-aspartyl-L-phenylglycerine and L-aspartyl-L-2, 5-dihydrophenyl-glycine, L-aspartyl-2,5-dihydro-L-phenylalanine; L-aspartyl-L-(1-cyclohexen)-alanine, neotame, or a combination thereof;

water-soluble sweeteners derived from naturally occurring water-soluble sweeteners, such as steviosides and stevia derived compounds such as but not limited to steviol glycosides such as rebaudiocides including rebaudiocide A, and the like, lo han quo and lo han quo derived compounds such as iso-mogroside V and the like, chlorinated derivatives of ordinary sugar (sucrose), e.g., chlorodeoxysugar derivatives such as derivatives of chlorodeoxysucrose or chlorodeoxygalactosucrose, known, for example, under the product designation of Sucralose; examples of chlorodeoxysucrose and chlorodeoxygalactosucrose derivatives include but are not limited to: 1-chloro-1'-deoxysucrose; 4-chloro-4-deoxy-alpha-D-galactopyranosyl-alpha-D-fructofuranoside, or 4-chloro-4-deoxygalactosucrose; 4-chloro-4-deoxy-alpha-D-galactopyranosyl-1-chloro-1-deoxy-beta-D-fructo-furanoside, or 4,1'-dichloro-4,1'-dideoxygalactosucrose; 1',6'-dichloro1',6'-dideoxysucrose; 4-chloro-4-deoxy-alpha-D-galactopyranosyl-1,6-dichloro-1,6-dideoxy-beta-D-fructofuranoside, or 4,1',6'-trichloro-4,1',6'-trideoxygalactosucrose; 4,6-dichloro-4,6-dideoxy-alpha-D-galactopyranosyl-6-chloro-6-deoxy-beta-D-fructofuranoside, or 4,6,6'-trichloro-4,6,6'-trideoxygalactosucrose; 6,1',6'-trichloro-6,1',6'-trideoxysucrose; 4,6-dichloro-4,6-dideoxy-alpha-D-galactopyranosyl-1,6-dichloro-1,6-dideoxy-beta-D-fructofuranoside, or 4,6,1',6'-tetrachloro4,6,1',6'-tetradeoxygalacto-sucrose; 4,6,1',6'-tetradeoxy-sucrose, or a combination thereof;

protein based sweeteners such as thaumaoccous danielli, talin, or a combination thereof; and amino acid based sweeteners.

The high intensity sweetener can be used in a variety of distinct physical forms, for example those known in the art to provide an initial burst of sweetness and/or a prolonged sensation of sweetness. Without being limited thereto, such physical forms include free forms (e.g., spray dried or powdered), beaded forms, encapsulated forms, or a combination thereof.

Specific high intensity sweeteners for use in the chewing gum composition include aspartame, neotame, sucralose, monatin, acesulfame potassium, an encapsulated form of the foregoing high intensity sweetener, or a combination thereof.

The amount of high intensity sweetener present in the confectionery composition can be about 0.01 to about 6 wt % based on the total weight of the confectionery composition, specifically about 1 to about 3 wt %. The amount of high intensity sweetener present in the particulate coating composition can be about 0.01 to about 6 wt % based on the total weight of the particulate coating composition, specifically about 1 to about 3 wt %.

The confectionery composition, the particulate coating composition or both can further include a sensate. Sensates can include cooling agents, warming agents, tingling agents, effervescent agents, or a combination thereof.

Cooling agents are additives that provide a cooling or refreshing effect in the mouth, in the nasal cavity, or on skin. For example, among the useful cooling agents are included menthane, menthone, ketals, menthone ketals, menthone glycerol ketals, substituted p-menthanes, acyclic carboxamides, mono menthyl glutarate, substituted cyclohexanamides, substituted cyclohexane carboxamides, substituted ureas and sulfonamides, substituted menthanols, hydroxymethyl and hydroxymethyl derivatives of p-menthane, 2-mercapto-cyclo-decanone, hydroxycarboxylic acids with 2-6 carbon atoms, cyclohexanamides, menthyl acetate, menthyl salicylate, N,2,3-trimethyl-2-isopropyl butanamide (WS-23), N-ethyl-2,2-diisopropylbutanamide, N-ethyl-p-menthane-3-carboxamide (WS-3), ethyl ester of N-[[5-methyl-2-(1-methylethyl)cyclohexyl]carbonyl]glycine (WS-5), as well as the substantially pure ethyl ester of N-[[5-methyl-2-(1-methylethyl)cyclohexyl]carbonyl]glycine as disclosed in U.S. Pat. No. 7,189,760 to Erman, et al which is incorporated in its entirety herein by reference, isopulegol, menthyloxy propane diol, 3-(1-menthoxy)propane-1,2-diol, 3-(1-menthoxy)-2-methylpropane-1,2-diol, p-menthane-2,3-diol, p-menthane-3,8-diol, 6-isopropyl-9-methyl-1,4-dioxaspiro[4,5]decane-2-methanol, menthyl succinate and its alkaline earth metal salts, trimethylcyclohexanol, N-ethyl-2-isopropyl-5-methylcyclohexanecarboxamide, Japanese mint oil, peppermint oil, 3-(1-menthoxy)ethan-1-ol, 3-(1-menthoxy)propan-1-ol, 3-(1-menthoxy)butan-1-ol, 1-menthylacetic acid N-ethylamide, 1-menthyl-4-hydroxypentanoate, 1-menthyl-3-hydroxybutyrate, N,2,3-trimethyl-2-(1-methylethyl)-butanamide, n-ethyl-t-2-c-6 nonadienamide, N,N-dimethyl menthyl succinamide, substituted p-menthanes, substituted p-menthane-carboxamides, 2-isopropanyl-5-methylcyclohexanol (from Hisamitsu Pharmaceuticals, hereinafter "isopregol"); menthone glycerol ketals (FEMA 3807, tradename FRESCOLAT® type MGA); 3-1-menthoxypropane-1,2-diol (from Takasago, FEMA 3784); and menthyl lactate; (from Haarman & Reimer, FEMA 3748, tradename FRESCOLAT® type ML), WS-30, WS-14, Eucalyptus extract (p-Mehta-3,8-Diol), Menthol (its natural or synthetic derivatives), Menthol PG carbonate, Menthol EG carbonate, Menthol glyceryl ether, N-tertbutyl-p-menthane-3-carboxamide, P-menthane-3-carboxylic acid glycerol ester, Methyl-2-isopryl-bicyclo (2.2.1), Heptane-2-carboxamide; Menthol methyl ether, menthyl pyrrolidone carboxylate; 2,5-dimethyl-4-(1-pyrrolidinyl)-3(2H)-furanone; cyclic α-keto enamines, cyclotene derivatives such as cyclopentenes including 3-methyl-2-(1-pyrrolidinyl)-2-cyclopenten-1-one and 5-methyl-2-(1-pyrrolidinyl)-2-cyclopenten-1-one, compounds of the formula:

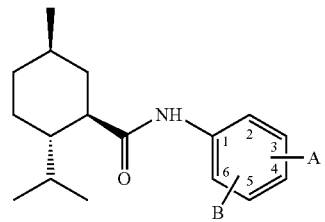

wherein B is selected from H, $CH_3$, $C_2H_5$, $OCH_3$, $OC_2H_5$; and OH; and wherein A is a moiety of the formula-CO-D, wherein D is selected from the following moieties: (i) —$NR^1R^2$, wherein $R^1$ and $R^2$ are independently selected from H and $C_1$-$C_8$ straight or branched-chain aliphatic, alkoxyalkyl, hydroxyalkyl, araliphatic and cycloalkyl groups, or $R^1$ and $R^2$ together with the nitrogen atom to which they are attached form part of an optionally-substituted, five- or six-membered heterocyclic ring; (ii) —$NHCH_2COOCH_2CH_3$, —$NHCH_2CONH_2$, —$NHCH_2CH_2OCH_3$, —$NHCH_2CH_2OH$, —$NHCH_2CH(OH)CH_2OH$ and (iii) a moiety selected from the group consisting of:

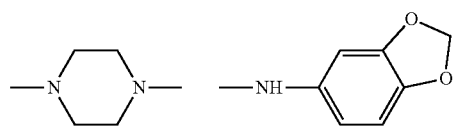

as disclosed in PCT Patent Application WO2006/125334 to Bell et al. which is incorporated in its entirety herein by reference, among others. Other compounds include the alpha-keto enamines disclosed in U.S. Pat. No. 6,592,884 to Hofmann et al. which is incorporated in its entirety herein by reference. These and other suitable cooling agents are further described in the following U.S. patents, all of which are incorporated in their entirety by reference hereto: U.S. Pat. Nos. 4,230,688; 4,032,661; 4,459,425; 4,178,459; 4,296,255; 4,136,163; 5,009,893; 5,266,592; 5,698,181; 6,277,385; 6,627,233; 7,030,273. Still other suitable cooling agents are further described in the following U.S. Published patent applications, all of which are incorporated in their entirety by reference hereto: U.S. 2005/0222256; 2005/0265930.

Warming agents can be selected from a wide variety of compounds known to provide the sensory signal of warming to the user. These compounds offer the perceived sensation of warmth, particularly in the oral cavity, and often enhance the perception of flavors, sweeteners and other organoleptic components. Among the useful warming compounds included are vanillyl alcohol n-butylether (TK-1000) supplied by Takasago Perfumary Company Limited, Tokyo, Japan, vanillyl alcohol n-propylether, vanillyl alcohol isopropylether, vanillyl alcohol isobutylether, vanillyl alcohol n-aminoether, vanillyl alcohol isoamylether, vanillyl alcohol n-hexylether, vanillyl alcohol methylether, vanillyl alcohol ethylether, gingerol, shogaol, paradol, zingerone, capsaicin, dihydrocapsaicin, nordihydrocapsaicin, homocapsaicin, homodihydrocapsaicin, ethanol, isopropol alcohol, iso-amylalcohol, benzyl alcohol, glycerine, or a combination thereof.

Tingling agents may be employed to provide a tingling, stinging or numbing sensation to the user. Tingling agents include, but are not limited to: Jambu Oleoresin or para cress (*Spilanthes* sp.), in which the active ingredient is Spilanthol; Japanese pepper extract (*Zanthoxylum peperitum*), including the ingredients known as Saanshool-I, Saanshool-II and Sanshoamide; perillartine; 4-(1-menthoxymethyl)-2-phenyl-1,3-dioxolane; black pepper extract (*Piper nigrum*), including the active ingredients chavicine and piperine; Echinacea extract; Northern Prickly Ash extract; trans-pellitorin, and red pepper oleoresin. In some embodiments, alkylamides extracted from materials such as jambu or sanshool may be included. Additionally, in some embodiments, a sensation is created due to effervescence. Such effervescence is created by combining an alkaline material with an acidic material, either or both of which may be encapsulated. In some embodiments, an alkaline material may include alkali metal carbonates, alkali metal bicarbonates, alkaline earth metal carbonates, alkaline earth metal bicarbonates or a combination thereof. In some embodiments, an acidic material may include acetic acid, adipic acid, ascorbic acid, butyric acid, citric acid, formic acid, fumaric acid, glyconic acid, lactic acid, phosphoric acid, malic acid, oxalic acid, succinic acid, tartaric acid or a combination thereof. Examples of "tingling" type sensates include those disclosed in U.S. Pat. Nos. 6,780,443, 6,159,509, 5,545,424, and 5,407,665, each of which is incorporated by reference herein in its entirety.

The amount of sensate present in the dual-textured confectionery product (either in the core, coating, or both) can be 0.001 to about 5.0 wt % based on the total weight of the dual-textured confectionery product, specifically about 0.01 to about 3.0 wt %, and more specifically about 0.1 to about 1 wt %.

The confectionery composition, the coating composition, or both can optionally further include a functional ingredient such as a breath freshener, a dental care component, a pharmaceutically active agent, an herbal, an effervescing system, an appetite suppressor, a vitamin, a micronutrient, a mouth moistening component, a throat care component, an energy boosting agent, a concentration boosting agent, or a combination thereof.

Coloring agents (colors, colorants, colorings) can be used in amounts effective to produce a desired color for the confectionery composition. Suitable coloring agents include pigments, which can be incorporated in amounts up to about 6 wt % based on the total weight of the composition. For example, titanium dioxide can be incorporated in amounts up to about 2 wt %, and specifically less than about 1 wt %. Suitable coloring agents also include natural food colors and dyes suitable for food, drug, and cosmetic applications. Suitable colors include annatto extract (E160b), bixin, norbixin, astaxanthin, dehydrated beets (beet powder), beetroot red/betanin (E162), ultramarine blue, canthaxanthin (E161g), cryptoxanthin (E161c), rubixanthin (E161d), violanxanthin (E161e), rhodoxanthin (E161f), caramel (E150 (a-d)), (3-apo-8'-carotenal (E160e), (3-carotene (E160a), alpha carotene, gamma carotene, ethyl ester of beta-apo-8 carotenal (E1600, flavoxanthin (E161a), lutein (E161b), cochineal extract (E120), carmine (E132), carmoisine/azorubine (E122), sodium copper chlorophyllin (E141), chlorophyll (E140), toasted partially defatted cooked cottonseed flour, ferrous gluconate, ferrous lactate, grape color extract, grape skin extract (enocianina), anthocyanins (E163), haematococcus algae meal, synthetic iron oxide, iron oxides and hydroxides (E172), fruit juice, vegetable juice, dried algae meal, tagetes (Aztec marigold) meal and extract, carrot oil, corn endosperm oil, paprika, paprika oleoresin, phaffia yeast, riboflavin (E101), saffron, titanium dioxide, turmeric (E100), turmeric oleoresin, amaranth (E123), capsanthin/capsorbin (E160c), lycopene (E160d), FD&C blue #1, FD&C blue #2, FD&C green #3, FD&C red #3, FD&C red #40, FD&C yellow #5 and FD&C yellow #6, tartrazine (E102), quinoline yellow (E104), sunset yellow (E110), ponceau (E124), erythrosine (E127), patent blue V (E131), titanium dioxide (E171), aluminium (E173), silver (E174), gold (E175), pigment rubine/lithol rubine BK (E180), calcium carbonate (E170), carbon black (E153), black PN/brilliant black BN (E151), green S/acid brilliant green BS (E142), or a combination thereof. In some embodiments, certified colors can include FD&C aluminum lakes, or a combination thereof. A full recitation of all FD& C colorants and their corresponding chemical structures may be found in the Kirk-Othmer Encyclopedia of Chemical Technology, 4th Edition, in volume 1 at pages 492-494, which text is incorporated herein by reference.

The fruit juice ingredient suitable for use in the chewy confectionery composition can include fruit juice, fruit juice concentrate, clarified fruit juice, fruit juice powder, including freeze-dried or spray-dried fruit juice powder, or a combination thereof.

The confectionery compositions can be prepared using standard techniques and equipment.

The confectionery composition can be formed into a confectionery composition substrate to be coated using a variety of processes including an extrusion process, a coextrusion process, a molding process, a rolling and scoring process, a chain die process, a rotary die process, rope cutting, casting, and the like, or a combination thereof.

The confectionery substrate may be formed to have any variety of different shapes and sizes, for example, slab, pellet, stick, strip, balls, cubes, cylinders, in the shapes of animals, people, and the like.

The confectionery composition can be prepared using a batch method, a continuous method, or a combination thereof.

In another embodiment, the chewy confectionery substrate further comprises crunchy particulates distributed throughout the substrate to provide added texture to the product. The crunchy particulates within the substrate can be a saccharide, a sugar alcohol, confectionery particulates, nonpareils, or a combination thereof. Within this embodiment, the confectionery particulates can be hard candy pieces, compressed candy, combinations thereof, and the like.

In an embodiment, the chewy confectionery substrate comprises a centerfill material. The centerfill material can be liquid; a solid including a powder, particulate, or granulate; or a semisolid.

In an embodiment, the dual-textured confectionery product is free of a non-particulate coating. Within this embodiment, the dual-textured confectionery product consists essentially of a particulate coating composition prepared from one or two particulate coating compositions. Alternatively, within this embodiment, the dual-textured confectionery product consists of a particulate coating composition prepared from one or two particulate coating compositions.

Texture Analysis

The dual-textured confectionery product provides a different chew texture and mouthfeel when chewed compared to traditional sanded chewy confectionery. Unlike regular sanded confectionery products, which provide some crunchy texture at the initial stages of the chew process, but quickly lose the crunchy texture imparted by the sanded coating, the dual-textured confectionery product provides a long-lasting chewy texture from the chewy confectionery composition substrate in addition to a crunchy texture provided by the coating that lasts for a substantial part of the chew process so that the consumer experiences multiple textures for much of the chew duration. Both the chewy texture and the crunchy texture are experienced during a substantial portion of the chewing process. As used herein, the "chewy texture" is a sensorial attribute where the product has a consistency that requires much chewing. As used herein, the "crunchy texture" is a sensorial attribute where the product produces a degree of perceived noise, reminiscent of a crunching noise from particulates that are rupturing/fracturing within the sample during chew-down (grits, crystals, etc.).

To quantitatively characterize the crunchiness of the dual-textured confectionery product a Texture Analyzer Test as set out in Example 2 can be conducted. In general, the Texture Analyzer Test is conducted using a texture analyzer equipped with a TA-17A 30 acrylic degree cone, compression mode, 1.00 mm/sec test speed, 20% strain as the target mode, five runs per sample type, and the results are provided as penetration distance (millimeters "mm") versus Force (grams).

The texture analyzer results obtained for the dual-textured confectionery product differ significantly from uncoated core samples or traditional sanded products prepared from particulate coatings have smaller particle size (e.g. the smaller particle sizes for the second particulate coating composition discussed herein). For example, uncoated starch-molded jelly confectionery exhibits texture analyzer curves that are substantially smooth, having very little variation in force as the probe penetrates the sample from 0.2 to 1 mm probe penetration distance (see FIG. 1. Control, uncoated; bottom trace). Starch-molded jelly confectionery having a traditional sanded coating with smaller particle size, as discussed above, also exhibits little variation in force as the probe penetrates the sample from 0.2 to 1 mm probe penetration distance (see FIG. 1. Control, coated; second to bottom trace). In comparison, the dual-textured confectionery product prepared with two particulate coating compositions, the first coating composition having a larger sugar particle size than the second coating composition exhibits a greater amount of variation in force as the probe penetrates the sample from 0.2 to 1 mm probe penetration distance (see FIG. 1. Sample 3, Double Coat, top trace; and Sample 4, Double Coat, second trace from top). The dual-textured confectionery product further requires more force to penetrate the sample.

In an embodiment, the dual-textured confectionery product has a crunchy texture attribute such that the product exhibits a total average Force having a standard deviation that is greater than 10, specifically greater than 20, and more specifically greater than 30, with an upper limit of 40 when tested with a texture analyzer according to the test method set out in Example 2, where the force is measured either from 0.2 to 1 mm probe penetration or at 0.6 mm probe penetration. The test method can be conducted using a texture analyzer equipped with a TA-17A 30 acrylic degree cone, conducted in compression mode, 1.00 mm/sec test speed, 20% strain as the target mode, five runs per sample type, and the results provided as penetration distance (mm) versus Force (grams).

In an embodiment, the dual-textured confectionery product has a texture attribute such that when tested with a texture analyzer, e.g. according to the test method set out in Example 2, an average force required to penetrate the product 1 mm is at least 3 times the force required to penetrate the chewy confectionery substrate free of the particulate coating, specifically at least 3.5 times the force, more specifically at least 4 times the force, and yet more specifically at least 4.5 times the force.

In an embodiment, the dual-textured confectionery product has a texture attribute such that when tested with a texture analyzer, e.g. according to the test method set out in Example 2, wherein a maximum force required to penetrate the product 1 mm is at least 50 grams, specifically at least 60 grams, more specifically at least 70 grams, or yet more specifically at least 80 grams.

The dual-textured confectionery product has the advantage of being less sticky (i.e., reduced adhesion) to teeth and orthodontic appliances when chewed by the consumer compared to traditional gummi and jelly confectionery. In an embodiment, the dual-textured confectionery product comprises a chewy confectionery substrate comprising a surface, and a particulate coating at least partially coating the surface of the confectionery substrate wherein the particulate coating comprises a particulate coating composition wherein at least 30%, specifically at least 40%, and more specifically at least 50% by weight of the particles have a particle size that is at least four times greater, specifically at least five times greater, and more specifically at least six times greater than the typical distance between human teeth, e.g. at least four times greater, specifically at least five times greater, and more specifically at least six times greater than 150 micrometers. The particulate coating composition can include a combination of a first particulate coating composition and a second particulate coating composition as described previously.

The features and advantages are more fully shown by the following examples which are provided for purposes of illustration, and are not to be construed as limiting the invention in any way.

EXAMPLES

Example 1: Dual-Textured Confectionery Product Starch-Molded Jellies

Starch-molded jelly candy pieces (substrate), substantially oblong in shape (~29 mm length×~11 mm width×~6 mm height) in piece weight of about 2.3 grams are prepared using standard starch molded candy technology from sugar, corn syrup, modified corn starch, flavor, and color. The starch-molded jelly candy pieces are coated with particulate materials using a one coating process or a two coating process. The one coating process involves exposing starch-molded jelly candy pieces to steam to render the surface tacky and then coating with a single particulate coating composition to form a dual-textured confectionery product ("Single Coat"). The two coating process involves exposing starch-molded jelly candy pieces to steam to render the surface tacky and then coating with a first particulate coating composition to form intermediate product pieces. The intermediate product pieces are then exposed to a second steam treatment to render the surface tacky and then coating with a second particulate coating composition to form a dual-textured confectionery product ("Double Coat"). No conditioning or drying step is used between the first and second coat steps. Various samples and the coating formulations are provided in Table 1. The food acid used in the coating can be citric, fumaric, malic, tartaric, or a combination.

TABLE 1

| Sample | First Treatment | First Coating | Second Treatment | Second Coating | Comment |
|---|---|---|---|---|---|
| Control, Uncoated | none | none | none | none | No crunch |
| Control, Single Coat | Steam | Standard Sugar* - 90%, Food acid - 10%; ~7-12 wt % coating based on wt final product | none | none | Very Mild/No crunch, good sour flavor |
| 1, Single Coat | Steam | Large Particle Sugar - 74%, Standard Sugar - 16%, Food acid - 10%; ~11 wt % coating based on wt final product | none | none | Mild/Moderate crunch, very sour flavor, uneven/inconsistent adhesion of large particles |
| 2, Single Coat | Steam | Large Particle Sugar; ~18.5 wt % coating based on wt final product | none | none | Moderate crunch, spaces between large particles, no sour |
| 3, Double Coat | Steam | Large Particle Sugar; ~18.5 wt % first coating based on wt final product | Steam | Standard Sugar - 90%, Food acid - 10%; ~9 wt % second coating based on wt final product | High crunch and good sour flavor |
| 4, Double Coat | Steam | Large Particle Sugar; ~20 wt % first coating based on wt final product | Steam | Standard Sugar - 77%, Food acid - 23%; ~10 wt % second coating based on wt final product | High crunch and strong sour flavor |

*Standard crystalline sugar particle size: >850 micrometers - maximum 2%, >425 micrometers - 30-70%, >300 micrometers - maximum 15%, and >180 micrometers - maximum 5%.
**Large particle, crystalline sugar particle size: >1700 micrometers - maximum 15% and >1180 micrometers - 30-65%.

Samples without large particle size crystalline sugar particles for the particulate coating composition, that is, the uncoated sample (Control, Uncoated) or standard sized crystalline sugar sample (Control, Single Coat), were unable to provide a sufficient dual-texture experience when chewed.

When the particulate coating composition contained large particles, the resulting coated product provided a dual texture, with a crunchy texture provided by the coating and a chewy texture provided by the jelly candy core (Samples 1-4). It was further found that the use of a two-step coating process, where large particles of sugar are applied as a first coating composition, followed by a second particulate coating composition made up of standard sized crystalline sugar particles and food acid provided a superior product in terms of dual texture where the product exhibited excellent crunch from the coating and good chewy texture from the jelly candy core, and good coverage of the substrate (Samples 3-4). The two step process ensured a sufficient amount of large particle, crystalline sugar adhered to the core in the first step while the second step provided standard size crystalline sugar particles that filled in open spaces to provide a more uniformly coated product. The use of the crystalline sugar as the particulate coating composition allowed for the color of the candy to be visible through the coating.

Example 2: Texture Analyzer Analysis Crunchy Attribute

Samples from Example 1 were tested for a crunchy chew texture attribute using a TA. XT. Plus Texture Analyzer (Stable Micro Systems, Texture Technologies Corp. Scarsdale, New York) and the raw data was collected using Exponent TA.XT program. Table 2 reports the samples tested and the texture analyzer method settings employed.

TABLE 2

| Samples | |
|---|---|
| Samples from Example 1 | Control, Uncoated |
| | Control, Single Coat |
| | Sample 3, Double Coat |
| | Sample 4, Double Coat |
| Sample testing position | Place sample flat and in full contact with the base table |
| Test 5 duplicates per sample | |
| Testing parameters | |
| Analyzer | TA. XT. Plus Texture Analyzer (Stable Micro Systems) |
| Program | Exponent TA.XT |
| T.A. Settings: Sequence Menu | |
| Test Mode | Compression |
| Pre-Test Speed | 10.00 mm/sec |
| Test Speed | 1.00 mm/sec |
| Post-Test Speed | 10.00 mm/sec |
| Target Mode | Strain |
| Strain | 20% |
| Trigger Type | Auto (force) |
| Trigger Force | 10.0 g |
| Advanced Options | Off |
| Probe Height Calibration | |
| Return Distance | 15 mm |
| Return Speed | 10 mm/sec |

TABLE 2-continued

| Contact Force | 5 g |
|---|---|
| Probe | TA-17A 30 degree cone, Acrylic |
| Calibration | Calibrate Force (with 5 Kg weight), Check Force (with nothing and with 2 Kg weight) Calibrate height |

The data obtained is reported in FIG. 1 as graphs of penetration distance of the probe into the sample in millimeters versus Force in grams based on the average of 5 runs (i.e., 5 duplicates per sample). As the texture analyzer curves illustrate, the uncoated jelly candy core (Control, uncoated; bottom trace) exhibits low Force and a relatively smooth trace without much variability. The jelly candy core sanded with standard size particulate sugar and a food acid mixture (Control, coated; second to bottom trace) exhibits a slightly higher force than the uncoated core, and a relatively smooth trace without much variability. These results are consistent with Sensory testing where the Control, uncoated samples exhibited no crunchy texture when chewed and the Control, coated samples exhibited a low crunchy attribute.

In comparison with the Control samples, the dual-textured confectionery products (Sample 3, Double Coat and Sample 4, Double Coat) have very different Texture Analyzer results as shown in FIG. 1. Sample 3, Double Coat (top trace) is a jelly candy core sanded with two particulate coating compositions, the first coating composition having a larger sugar particle size than the second coating composition. This trace shows a large Force that was variable. A similar result was obtained for Sample 4, Double Coat (second trace from top), which is also a jelly core sanded with two particulate coating compositions, the first coating composition having a larger sugar particle size than the second coating composition. The Texture Analyzer results of surface penetration of the dual-textured confectionery products with the test probe are indicative of a crunchiness texture attributes associated with a large and variable crunch.

The Texture Analyzer data to measure the "crunchiness" attribute is further summarized in Table 3 below for data obtained between 0.2 mm to 1.0 mm probe penetration and for 0.6 mm probe penetration; all data based on 5 replicates.

TABLE 3

| | Probe penetration distance | | | |
|---|---|---|---|---|
| | From 0.2 to 1 mm | | 0.6 mm | |
| | Total | | | |
| | average Force (grams) | Standard deviation | Average Force (grams) | Standard deviation |
| Sample 4, Double Coat | 68.39 | 22.65 | 75.4 | 28.52 |
| Sample 3, Double Coat | 107.11 | 39.12 | 116.77 | 39.98 |
| Control, uncoated | 14.98 | 2.78 | 14.94 | 2.40 |
| Control, coated | 31.07 | 6.16 | 32.73 | 7.47 |

The standard deviation of for the dual-textured confectionery products (Sample 3, Double Coat and Sample 4, Double Coat) are 3-6 times greater than the standard deviation of the Control, coated sample and 8-14 times greater than the standard deviation of the Control, uncoated sample for the results between 0.2 to 1 mm probe penetration. The standard deviation of for the dual-textured confectionery products (Sample 3, Double Coat and Sample 4, Double Coat) are 3-5 times greater than the standard deviation of the Control, coated sample and 11-16 times greater than the standard deviation of the Control, uncoated sample for the results at 0.6 mm probe penetration. Such results show that the dual-textured confectionery products have more variation of crunchiness versus the smoother texture of the Control samples. Such variation is indicative of the crunchy texture of the product when chewed.

Example 3: Texture Sensory Test

A chew test was conducted comparing i) Control, Single Coat to ii) Sample 3, Double Coat and iii) Sample 4, Double Coat candies of Example 1.

Panel Evaluation: A panel of six human test subjects was assembled to chew the samples and determine the extent of time of each of two attributes experienced during the chewing process: a "chewy" characteristic and a "crunchy" characteristic. Each subject was provided with a stopwatch and three pieces of each sample. The subjects were asked to chew one piece of sample at a time and focus on only one attribute per piece as instructed below.

Instructions: Start with the Control, Single Coat and chew the sample and measure in seconds how long it takes to fully chew the piece (from the first bite down to when you start to swallow). For the second piece of the Control, Single Coat, time in seconds how long the sample presents a "chewy" characteristic; start the time when you first sense a "chewy" sensation and stop the timer when the candy is no longer chewy or is ready to swallow. If there was no chewy sensation, report "0 sec". For the second piece of the Control, Single Coat, time in seconds how long the candy presents a "crunchy" characteristic; start the time when you first sense a "crunchy" sensation and stop the timer when the candy is no longer crunchy (candy only presents a chewy sensation or it is ready to swallow). If there was no crunch sensation, report "0 sec". Repeat the procedure with each of Sample 3, Double Coat and Sample 4, Double Coat. Provide overall comments about the samples.

The results of the chew test are provided in Table 4 below. The durations of time for the first and second flavor sensations and percentages of total chew time are also provided. The results were averaged across the eight subjects and the two repetitions.

TABLE 4

| Time Points | Control, Single Coat | Sample 3, Double Coat | Sample 4, Double Coat |
| --- | --- | --- | --- |
| Total time to chew in seconds (average) | 33 | 34 | 34 |
| Percent of total chew time of "chewy" characteristic (average) | 86 | 76 | 84 |
| Percent of total chew time of "crunchy" characteristic (average) | 6 | 84 | 86 |

The dual-textured confectionery products (Sample 3, Double Coat and Sample 4, Double Coat) exhibited both a chewy texture attribute and a crunchy texture attribute throughout much of the chew duration when being consumed. Unlike the dual-textured confectionery products, the Control, Single Coat sample, although containing a particulate coating, only provided a crunchy texture attribute for 6 percent of the chew time and predominantly a chewy texture attribute. Panelists described the Control, Single Coat sample as having a "very mild crunch upon first 2 chews", "slight crunch", and "lots of tooth sticking". Sample 3, Double Coat was described as "chewiness present through most of eating, crunchy all the way through, ending particles are crunchy", "crunch was still present when samples was ready to swallow", and "mostly just crunchy crystals at the end, less tooth-sticking than [Control, Single Coat]". Sample 4, Double Coat was described as "chewiness present through most of eating, crunchy particles still present at the end", "crunch still present when samples was ready to swallow, more sour than control", and "similar to [Sample 3, Double Coat]".

Example 4: Texture Analyzer Analysis—Stickiness Attribute I

A texture analyzer test was conducted to determine the relative stickiness (i.e., adhesion) of a dual-textured confectionery product Sample 3, Double Coat compared to a comparative control sample having a coating of fine particulate sugar. Each sample is pressed into a bladed extrusion plate and the maximum force (in Newtons (N)) required to press the sample through the gaps in the plate was measured. A TA. XT. Plus Texture Analyzer (Stable Micro Systems, Texture Technologies Corp. Scarsdale, New York) was used and the raw data was collected using Exponent TA.XT program. The following table reports the samples tested and the texture analyzer method settings employed.

TABLE 5

| Samples | |
| --- | --- |
| Samples from Example 1 | Control, Single Coat |
| | Sample 3, Double Coat |
| Set up | Attach Ottawa Cell Unit to Texture Analyzer base platform |
| | Insert Grill plate (A/TBL 17 Bladed Extrusion Plate) |
| | Attach square plate probe to Texture Analyzer unit screw |
| | Align unit so that the square top plate is not touching the walls of the unit |
| | Lower top plate to about 1 inch above the grill |
| | Calibrate |
| Sample testing position | Raise top plate to above the walls of the unit |
| | Place sample flat and centered on the grill plate |
| | Lower top plate until ~½ inch above the candy piece |
| | Run test |
| | When test is complete remove sample, clean all parts and repeat test procedure with next sample. |
| Test 5 duplicates per sample | |
| Testing parameters | |
| Analyzer | TA. XT. Plus Texture Analyzer (Stable Micro Systems) |
| Program | Exponent TA.XT |
| T.A. Settings: Sequence Menu | |
| Test Mode | Compression |
| Pre-Test Speed | 10.00 mm/sec |
| Test Speed | 1.00 mm/sec |
| Post-Test Speed | 10.00 mm/sec |
| Target Mode | Strain |
| Strain | 100% |
| Trigger Type | Auto (force) |
| Trigger Force | 10.0 g |
| Advanced Options | Off |
| Probe Height Calibration | |
| Return Distance | 20 mm |
| Return Speed | 10 mm/sec |
| Contact Force | 5 g |

TABLE 5-continued

| | |
|---|---|
| Probe | Square plate probe |
| Base platform | A/TBL 17 Bladed Extrusion Plate for Ottawa Cell |
| Calibration | Calibrate height |
| | Check Force (with nothing and with 2 Kg weight) |

Based on the obtained data, on average the dual-textured confectionery product Sample 3, Double Coat required 37% more force (367 N; standard deviation 8.3, coefficient of variation, 2.3) to be pushed into the bottom grill plate by the descending flat probe than the force required for the Control, Single Coat sample (267 N; standard deviation 11.2, coefficient of variation, 4.2). Not wishing to be bound by theory, but the hypothesis is that the larger size particulates of Sample 3, Double Coat causes more resistance entering the spaces in the grill plate. This would be comparable to the larger particle coating of Sample 3, Double Coat also having more resistance to entering even smaller gaps, such as the gaps between human teeth. The theory is that because it is harder for the Sample 3, Double Coat product to enter the gaps between the consumer's teeth, it therefore "sticks" less in the teeth while chewing, making the sample easier to eat than traditional chewy candy having a smaller sized particulate coating, or even no particulate coating at all.

Example 5: Texture Analyzer Analysis—Stickiness Attribute II

A texture analyzer test was conducted to determine the relative stickiness (i.e., adhesion) of a dual-textured confectionery product Sample 5, Double Coat (similar to Example 3, Double Coat of Example 1 with 23 wt % total of first and second coating based on weight of the final product) compared to two different comparative control samples: Control, Uncoated (Example 1) and Control, Single Coat (Example 1), having a coating of fine particulate sugar. To run the texture analyzer test on each sample, two pieces of candy were placed together in one side of a human mouth and chewed for 15 chews. The chewing process was conducted by a single person for all samples being compared and was carried out as consistently as possible across the samples. The tongue was used to remove the chewed sample off of the teeth and immediately used in the texture analyzer test. The chewed sample was formed into a ball using fingers and then flattened into a bolus having a cylinder shape with a flat top and bottom surface; each sample was formed with the goal of having a similar height between samples. The bolus was placed on the Texture Analyzer bottom plate under the center of a 10 mm cylindrical stainless steel probe, with the top surface of the sample made to be relatively flat. The samples were always wider than the probe. At the start of the test, the probe was positioned close to the top of the bolus, but not touching it. To run the test, the probe was set to come down to the surface of the bolus at 0.5 mm/sec and slightly push down on the bolus; holding a constant pressure of 50 g for 10 sec and then pulled up at a speed of 0.5 mm/sec. The system collected force (g) vs. time (sec) data. The graph was configured so that the force of the probe pulling up showed as a positive peak. The probe was not allowed to lift the bolus off of the bottom plate, but to remain sitting fully on the bottom plate. When the test was completed, the sample was removed and all the parts of the texture analyzer were cleaned and dried prior to repeating the test procedure with the next sample. The process was repeated for all replicates per sample (2 pieces per test×5 tests per sample×1-4 replicates per set).

The test was conducted on 20 samples of Control, Single Coat (Example 1), 15 samples of Sample 5, Double Coat, and 5 samples of Control, Uncoated (Example 1). A TA. XT. Plus Texture Analyzer (Stable Micro Systems, Texture Technologies Corp. Scarsdale, New York) was used and the raw data was collected using Exponent TA.XT program. Table 6 reports the samples tested and the texture analyzer method settings employed.

TABLE 6

| | |
|---|---|
| Samples | |
| Samples from Example 1 | Control, Uncoated |
| | Control, Single Coat |
| | Sample 5, Double Coat (similar to Example 3, Double Coat of Example 1 with ~23 wt % total of first and second coating based on weight of the final product) |
| Testing parameters | |
| Analyzer | TA. XT. Plus Texture Analyzer (Stable Micro Systems) |
| Program | Exponent TA.XT |
| T.A. Settings: | |
| Adhesive Test | |
| Pre-Test Speed | 0.50 mm/sec |
| Test Speed | 0.50 mm/sec |
| Post-Test Speed | 10.00 mm/sec |
| Applied Force | 50.0 g |
| Return Distance | 10.0 mm |
| Contact Time | 10.00 sec |
| Trigger Type | Auto |
| Trigger Force | 5.0 g |
| Stop Plot At | Final Position |
| Tare Mode | Auto |
| Delay Acquisition | Off |
| Advanced Options | On |
| Proportional Gain | 50 |
| Integral Gain | 20 |
| Differential Gain | 5 |
| Max. Tracking Speed | 5.00 mm/sec |
| Probe Height Calibration | |
| Return Distance | 25 mm |
| Return Speed | 5 mm/sec |
| Contact Force | 5 g |
| Probe | Stainless Steel 10 mm Cylindrical |
| Base platform | Heavy Duty Platform—HDP |
| SetUp and Calibration | Setup Program with above settings |
| | Calibrate Force (with 5 Kg weight) |
| | Check Force (with nothing and with 2 Kg weight) |
| | Calibrate Height |

TABLE 7

| | Average Maximum Force | Standard Deviation Maximum Force | Average Area Under Curve | Standard Deviation Area |
|---|---|---|---|---|
| Control, Uncoated | 200 | 17 | 100 | 30.2 |
| Control, Single Coat | | | | |
| Rep 1 | 205.7 | 23.3 | 94.4 | 41.7 |
| Rep 2 | 191.4 | 14.9 | 101.3 | 28.5 |

TABLE 7-continued

| | Average Maximum Force | Standard Deviation Maximum Force | Average Area Under Curve | Standard Deviation Area |
|---|---|---|---|---|
| Rep 3 | 210.0 | 28.9 | 96.6 | 32.6 |
| Rep 4 | 208.4 | 17.6 | 101.7 | 33.1 |
| Average Sample 5, Double Coat | 204 | 21 | 97 | 34 |
| Rep 1 | 145.7 | 10.6 | 61.3 | 17.9 |
| Rep 2 | 149.8 | 21.5 | 79.3 | 8.7 |
| Rep 3 | 136.7 | 14.8 | 54.5 | 8.5 |
| Average | 144 | 16 | 65 | 12 |

Table 7 reports a summary of the results of the texture analyzer test. The Control, Single Coat samples demonstrated a significantly greater maximum force (57% greater) needed to retract the 10 mm cylindrical probe after the 10 sec (50 g force) contact with the bolus than did the Sample 5, Double Coat. The average maximum force for Control, Single Coat was 204 grams, versus an average maximum force of 144 grams for Sample 5, Double Coat. The standard deviation of the maximum force was 16-21, a much smaller number (3× smaller) than the difference between the Control, Single Coat and Sample 5, Double Coat maximum force averages. The maximum force for Control, Uncoated (200 g) was essentially equivalent to the maximum force for the fine particulate coated Control, Single Coat (204 g).

The area under the curve was generally larger for Control, Single Coat (97 average) and Control, Uncoated (100 average) than for Sample 5, Double Coat (65 average).

Interpretation of Results: The greater maximum force and larger area under the curve for Control, Single Coat as compared to the Sample 5, Double Coat sample, indicates that the control product is more sticky after chewing than the sample coated with a dual-coating of large+small particles. These results align with the sensory observation (see Example 6) that Sample 5, Double Coat samples are easier to chew and adheres less to your teeth than the control product. Not wishing to be bound by theory, but a possible reason the Sample 5, Double Coat product adheres less (to the 10 mm probe and to human teeth) may be that the larger size particulates of Sample 5, Double Coat are larger than the particulate coating on Control, Single Coat. These larger particles dissolve slower in the mouth than the fine sugar/acid that makes up the coating on Control, Single Coat. These larger sugar particles act as a barrier between the sticky jelly of the candy and the consumer's teeth, both at the first bite of the sample and as the sample is broken down by chewing—the larger particles stay mostly intact and disperse throughout the jelly candy, acting as a dry, non-sticky material that reduces the contact of the sticky jelly candy with the consumer's teeth or in this case, the metal probe.

Example 6: Discrimination Panel 2-AFC (Alternate Forced Choice) Test: Sensory Attribute "Stickiness"

A 2-AFC (Alternate Forced Choice) Test was conducted to quantify the theory that Sample 5, Double Coat (similar to Example 3, Double Coat of Example 1 with 23 wt % total of first and second coating based on weight of the final product), a dual-textured jelly confectionery product having a particulate coating prepared by a first application of a particulate coating composition containing larger sugar particles followed by the application of a second particulate coating composition containing standard sized crystalline sugar particles and food acid, is less sticky (i.e., less adhesive) than Control, Single Coat (Example 1), a jelly candy core sanded with smaller size particulate sugar and a food acid mixture.

Directional Difference Test (2-AFC) is a scientific method listed under the "Standard Guide for Sensory Claim Substantiation" (ASTM E1958—16a). Directional Difference Test (2-AFC) is an established scientific method to quantify the differences between 2 samples (ASTM E 2164-01). 2-AFC Testing Protocol as defined by ASTM is summarized in Table 8.

TABLE 8

Two Alternative-Forced-Choice (2-AFC) Testing Protocol as Defined by ASTM

| | |
|---|---|
| Test description | This is a forced-choice procedure. It is used to determine whether one sample has more of a particular sensory attributes than another. Two samples are presented, and the respondent chooses one of the samples as having a higher level of a specific characteristic. |
| Panel | N = 20-100<br>Semi-trained panel<br>Screened for acuity<br>Must be familiar with the procedure and some training can be done on attribute of interest, for example, an off-note (but this is not a requirement). |
| Samples | 2 products presented<br>Blind with 3-digit codes<br>Served sequentially or simultaneously |
| Question asked | Only one question asked:<br>E.g. Which sample is more sticky? |
| Analysis | Determines if two samples are different in a specified sensory attribute at 95% CL |

Directional Difference (2-Alternative Forced Choice) Discrimination METHODOLOGY (One-sided test). Sample 5, Double Coat and Control, Single Coat products were presented blindly with 3-digit-codes, at 2 replications to 53 Discrimination Panelists. A 4 minute clearance time was given between the two samples and a 15 minute break was given between 2 replicates. The panelists were provided with the following instructions:

"There are 2 sour chewy candy samples on your tray. Evaluate the samples from left to right on your tray (i.e. chew sample in "A" slot first).

Place the entire candy between your molars and begin to chew until completely dissolved.

There will be 4:00 clearing time between samples.

Place the entire second candy between your molars and begin to chew until dissolved.

After the timer is up, immediately click on "next" to move forward to the next page where you will be asked to select the sample that is more sticky."

Results: 91% of Panelist responses (53 people, 2 replications; total of 106 impressions) were that Control, Single Coat was more sticky than Sample 5, Double Coat. 2-AFC results Sample 5, Double Coat samples were significantly less sticky (i.e., less adhesion) than Control, Single Coat at 95% confidence.

Not wishing to be bound by theory, but the reduced adhesion in the human mouth may be because the large particles of the particulate coating in the Sample 5, Double Coat are larger than the gaps between human teeth. The large particles may therefore be blocking the jelly candy from getting into the gaps between the teeth, where the jelly candy would normal get into and gets stuck, as with Control, Single Coat. If the jelly candy cannot get into these gaps, it will adhere less to the teeth overall.

As used herein the terms "comprising" (also "comprises," etc.), "having," and "including" is inclusive (open-ended) and does not exclude additional, unrecited elements or method steps. The singular forms "a," "an," and "the" include plural referents unless the context clearly dictates otherwise. The endpoints of all ranges directed to the same characteristic or component are independently combinable, and inclusive of the recited endpoint. The term "combination" is inclusive of a homogenous or non-homogenous blend, or mixture of the named components into an integrated whole. The term "homogenous" refers to a uniform blend of the components. The word "or" means "and/or." The terms "front", "back", "bottom", and/or "top" are used herein, unless otherwise noted, merely for convenience of description, and are not limited to any one position or spatial orientation. "Optional" or "optionally" means that the subsequently described event or circumstance may or may not occur, and that the description includes instances where the event occurs and instances where it does not. Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments. In general, the compositions or methods may alternatively comprise, consist of, or consist essentially of, any appropriate components or steps herein disclosed. The invention may additionally, or alternatively, be formulated so as to be devoid, or substantially free, of any components, materials, ingredients, adjuvants, or species, or steps used in the prior art compositions or that are otherwise not necessary to the achievement of the function and/or objectives of the present claims.

While the invention has been described with reference to an exemplary embodiment, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A dual-textured confectionery product, comprising:
a chewy confectionery substrate comprising a surface, and a particulate coating at least partially coating the surface of the confectionery substrate;
wherein the particulate coating has a multimodal particle size distribution and comprises a first particulate coating composition having a first particle size distribution and a second particulate coating composition having a second particle size distribution, wherein a mode of the first particle size distribution is different from a mode of the second particle size distribution;
wherein the first particulate coating composition comprises a crystalline saccharide particulate having the first particle size distribution wherein 30- to 80% by weight of the first particulate coating composition has a particle size of greater than 1180 micrometers and less than 1700 micrometers and 0 to 15% by weight of the first particulate coating composition has a particle size that is greater than 1700 micrometers; and
the second particulate coating composition comprises a crystalline saccharide particulate having the second particle size distribution wherein 30- to 75% by weight of the second particulate coating composition has a particle size of greater than 425 micrometers and less than 850 micrometers and 0- to 5% by weight of the second particulate coating composition has a particle size that is greater than 850 micrometers,
wherein particle size is determined by sieve analysis.

2. The product of claim 1, wherein the chewy confectionery substrate is a gummi, a jelly, a starch based jelly, a pectin based jelly, a carrageenan based jelly, a konjac based jelly, a tapioca based jelly, a gum Arabic based jelly, a gum tragacanth based jelly, an agar-agar based jelly, a gellan based jelly, a wine gum confectionery, a gum drop, licorice, a low boiled confectionery, a caramel, a nougat, a fudge, a toffee, a taffy, a chewing gum, a bubble gum, or a combination thereof.

3. The product of claim 1, wherein the chewy confectionery substrate is a gummi, a jelly, a starch based jelly, a pectin based jelly, a carrageenan based jelly, a konjac based jelly, a tapioca based jelly, a gum Arabic based jelly, a gum tragacanth based jelly, an agar-agar based jelly, or a gellan based jelly.

4. The product of claim 1, wherein the saccharide is sucrose (sugar), dextrose/glucose, maltose, dextrin, xylose, ribose, mannose, galactose, fructose (levulose), lactose, or a combination thereof.

5. The product of claim 1, wherein the first particulate coating composition and the second particulate coating composition comprise crystalline sucrose.

6. The product of claim 1, wherein the particulate coating composition further comprises a food acid or salt thereof, a colorant, a flavorant, a high-intensity sweetener, a sensate, a flavor modulator or potentiator, a functional ingredient, a fruit juice ingredient, or a combination thereof in the first particulate coating composition, the second particulate coating composition, or a combination thereof.

7. The product of claim 1, wherein the particulate coating composition is present in an amount of about 7 to about 50 wt % based on the total weight of the dual-textured confectionery product.

8. The product of claim 1, wherein the second particulate coating composition comprises a food acid in an amount of about 5 to about 35 wt % based on the total weight of the second particulate coating composition; or about 1 to about 15 wt % based on the total weight of the particulate coating composition.

9. The product of claim 8, wherein the food acid is acetic acid, adipic acid, ascorbic acid, butyric acid, citric acid, formic acid, fumaric acid, glyconic acid, lactic acid, phosphoric acid, malic acid, oxalic acid, succinic acid, tartaric acid, or a combination thereof and
wherein the food acid is unencapsulated, encapsulated, or a combination of encapsulated and unencapsulated food acid.

10. A dual-textured confectionery product, comprising:
a gummi or jelly confectionery substrate comprising a surface, and a particulate coating at least partially coating the surface of the confectionery substrate;
wherein the particulate coating has a multimodal particle size distribution and comprises a first particulate coating composition having a first particle size distribution and a second particulate coating composition having a second particle size distribution, wherein a mode of the first particle size distribution is different from a mode of the second particle size distribution;
wherein the first particulate coating composition comprises a crystalline saccharide particulate having the first particle size distribution wherein 30- to 80% by weight of the first particulate coating composition has a particle size of greater than 1180 micrometers and less than 1700 micrometers and 0 to 15% by weight of the first particulate coating composition has a particle size that is greater than 1700 micrometers-; and
the second particulate coating composition comprises a crystalline saccharide particulate having the second particle size distribution wherein 30-to 75% by weight of the second particulate coating composition has a particle size of greater than 425 micrometers and less than 850 micrometers and 0- to 5% by weight of the second particulate coating composition has a particle size that is greater than 850 micrometers,
wherein particle size is determined by sieve analysis.

11. The product of claim 1, wherein the dual-textured confectionery product has a crunchy texture attribute such that the product exhibits a total average Force having a standard deviation that is greater than 10 with an upper limit of 40 when tested with a texture analyzer according to a test method conducted using a texture analyzer equipped with a TA-17A 30 acrylic degree cone, conducted in compression mode, 1.00 mm/sec test speed, 20% strain as the target mode, five runs per sample type, with results provided as penetration distance (mm) versus Force (grams), where the force is measured either from 0.2 to 1 mm probe penetration or at 0.6 mm probe penetration.

12. A method of making a dual-textured confectionery product, comprising:
forming a tacky surface on at least a portion of a surface of a chewy confectionery composition substrate;
applying a first particulate coating composition having a first particle size distribution to at least a portion of the tacky surface to form an intermediate product comprising a surface;
forming a tacky surface on at least a portion of a surface of the intermediate product;
applying a second particulate coating composition having a second particle size distribution to at least a portion of the tacky surface to form the dual-textured confectionery product; and
optionally further packaging the product,
wherein the dual-textured confectionery product has a particulate coating having a multimodal particle size distribution, wherein the particulate coating is comprised of the first particulate coating composition and the second particulate coating composition and wherein a mode of the first particle size distribution is different from a mode of the second particle size distribution,
wherein the first particulate coating composition comprises a crystalline saccharide particulate having the first particle size distribution wherein 30- to 80% by weight of the first particulate coating composition has a particle size of greater than 1180 micrometers and less than 1700 micrometers and 0 to 15% by weight of the first particulate coating composition has a particle size that is greater than 1700 micrometers-; and
the second particulate coating composition comprises a crystalline saccharide particulate having the second particle size distribution wherein 30- to 75% by weight of the second particulate coating composition has a particle size of greater than 425 micrometers and less than 850 micrometers and 0- to 5% by weight of the second particulate coating composition has a particle size that is greater than 850 micrometers,
wherein particle size is determined by sieve analysis.

13. The method of claim 12, wherein the forming a tacky surface on at least a portion of a surface of a chewy confectionery composition substrate or on at least a portion of a surface of the intermediate product is conducted by exposing the surface to steam, applying a binder solution to the surface, or a combination thereof.

14. The method of claim 12, wherein the chewy confectionery substrate is a gummi, a jelly, a starch based jelly, a pectin based jelly, a carrageenan based jelly, a konjac based jelly, a tapioca based jelly, a gum Arabic based jelly, a gum tragacanth based jelly, an agar-agar based jelly, a gellan based jelly, a wine gum confectionery, a gum drop, licorice, a low boiled confectionery, a caramel, a nougat, a fudge, a toffee, a taffy, a chewing gum, a bubble gum, or a combination thereof.

15. The method of claim 12, wherein the chewy confectionery substrate is a gummi, a jelly, a starch based jelly, a pectin based jelly, a carrageenan based jelly, a konjac based jelly, a tapioca based jelly, a gum Arabic based jelly, a gum tragacanth based jelly, an agar-agar based jelly, or a gellan based jelly.

16. The method of claim 12, wherein the saccharide is sucrose (sugar), dextrose/glucose, maltose, dextrin, xylose, ribose, mannose, galactose, fructose (levulose), lactose, or a combination thereof.

17. The method of claim 12, wherein the first particulate coating composition and the second particulate coating composition comprise crystalline sucrose.

18. The method of claim 12, wherein the first particulate coating composition, the second particulate coating composition, or a combination thereof further comprises a food acid or salt thereof, a colorant, a flavorant, a high-intensity sweetener, a sensate, a flavor modulator or potentiator, a functional ingredient, a fruit juice ingredient, or a combination thereof in the first particulate coating composition, the second particulate coating composition, or a combination thereof.

19. The method of claim 12, wherein the combination of first and second particulate coating composition is present in an amount of about 7 to about 50 wt % based on the total weight of the dual-textured confectionery product.

20. The method of claim 12, wherein the second particulate coating composition comprises a food acid in an amount of about 5 to about 35 wt % based on the total weight of the second particulate coating composition; or about 1 to about 15 wt % based on the total weight of the particulate coating composition.

21. The method of claim 18, wherein the food acid is acetic acid, adipic acid, ascorbic acid, butyric acid, citric acid, formic acid, fumaric acid, glyconic acid, lactic acid, phosphoric acid, malic acid, oxalic acid, succinic acid, tartaric acid, or a combination thereof; and
wherein the food acid is unencapsulated, encapsulated, or a combination of encapsulated and unencapsulated food acid.

22. The product of claim 1, wherein the dual-textured confectionery product has a texture attribute such that when tested with a texture analyzer equipped with a TA-17A 30 acrylic degree cone, conducted in compression mode, 1.00 mm/sec test speed, 20% strain as the target mode, five runs per sample type, with results provided as penetration distance (mm) versus Force (grams), an average force required to penetrate the product 1 mm is at least 3 times the force required to penetrate the chewy confectionery substrate free of the particulate coating.

23. The product of claim 1, wherein the dual-textured confectionery product has a texture attribute such that when tested with a texture analyzer equipped with a TA-17A 30 acrylic degree cone, conducted in compression mode, 1.00 mm/sec test speed, 20% strain as the target mode, five runs per sample type, with results provided as penetration distance (mm) versus Force (grams), a maximum force required to penetrate the product 1 mm is at least 50 grams.

24. The product of any one of claim 1, wherein the dual-textured confectionery product provides a crunchy sensory attribute when the product is chewed that lasts for at least 50% of the time of the chew duration.

25. The product of claim 1, wherein when chewed the dual-textured confectionery product sticks to the teeth of the consumer less than compared to a corresponding product free of the first particulate coating composition or free of the particulate coating.

26. The method of claim 12, wherein when consumed the dual-textured confectionery product sticks to the teeth of the consumer less than compared to a corresponding product free of the first particulate coating composition or free of the particulate coating.

27. The method of claim 12, wherein when consumed the dual-textured confectionery product adheres to a consumer's teeth, dental braces, palatal expanders, dental retainers, and/or other orthodontic appliances less than compared to a corresponding product free of the first particulate coating composition or free of the particulate coating.

\* \* \* \* \*